Oct. 29, 1940.  C. L. MOWRER  2,220,000
DETACHABLE NOSEPIECE FOR BIFOCAL EYEGLASSES
Filed March 25, 1939
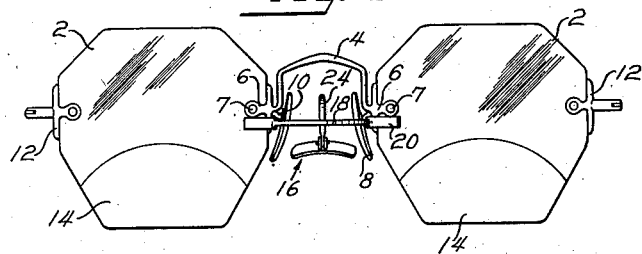
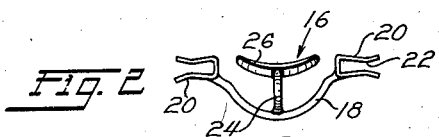
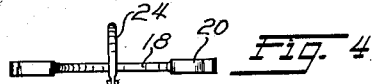
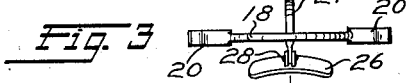
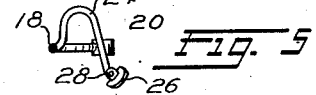
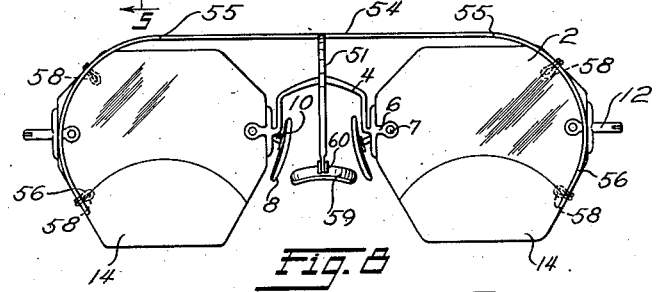
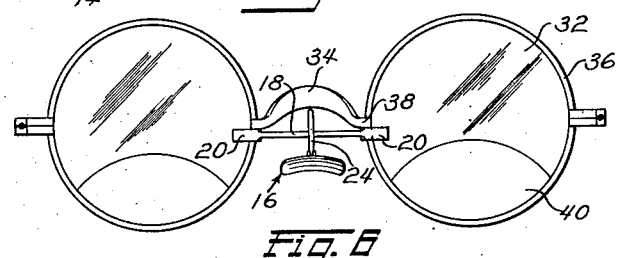
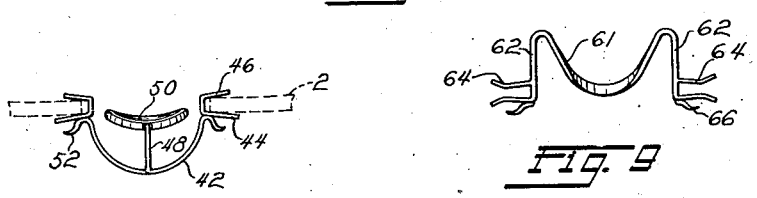
Inventor
Charles L. Mowrer
By Strauch & Hoffman
Attorneys Patented Oct. 29, 1940

2,220,000

UNITED STATES PATENT OFFICE 2,220,000

DETACHABLE NOSEPIECE FOR BIFOCAL EYEGLASSES

Charles L. Mowrer, Hagerstown, Md.

Application March 25, 1939, Serial No. 264,202

13 Claims. (Cl. 88—41)

This invention relates to eyeglasses and more particularly to attachments for eyeglasses of the bifocal type.

In bifocal eyeglasses the reading segments are located in the lower parts of the lenses and below the normal line of vision of the wearer's eyes. Accordingly, to see through the reading segments, the wearer must either lower his eyes or tip back his head in order to bring his line of vision through the reading portions of the lenses. This renders the use of glasses of the bifocal type for long and continuous reading rather troublesome and tiresome, due to the physical effort necessary to bring the line of vision through the reading segments. This is particularly noticeable where reading is prolonged for a considerable period and the resulting physical and mental strain becomes a very serious matter.

Therefore, it has been proposed to divide the bridge pieces of bifocal eyeglasses with permanently attached auxiliary nosepieces which can be moved into operative position to raise the glasses relative to the wearer's eyes and bring the bifocal reading segment into his line of vision. In this manner the troublesome, physical, and mental strain, aforementioned, may be obviated. However, arrangements of this type, although theoretically correct, have proven unsatisfactory from a practical aspect. This is due principally to the cumbersome and complex nature of these auxiliary bridge or nosepieces, as well as to unsightly appearance presented, and the increased weight added, by these permanently attached auxiliary nosepieces. Furthermore, devices of this type known to the prior art lack the necessary adjustability for adapting them to different types of eyeglass mountings and to the different physical characteristics of the individual wearer. For these and other reasons, auxiliary nosepieces of the permanently attached type have not provided a satisfactory and practical solution for this problem.

The present invention is, therefore, particularly concerned with novel means for accomplishing these desired results without, however, involving any of the disadvantageous features of a permanent mounting. These disadvantages are overcome in the present invention by providing simple, yet universally adaptable, detachable nosepieces which may be easily placed on, and removed from, a bifocal eyeglass and which, when in place on the eyeglass, raise them to bring the reading segment clearly within the wearer's normal line of vision.

Accordingly, it is a principal object of the present invention to provide novel detachable nosepieces for bifocal eyeglasses which can be readily put on and taken off and which, when in place, rest on the wearer's nose so as to elevate the lenses just sufficiently to bring the reading segments within the normal line of vision of the wearer.

A further object of the present invention is to provide novel detachable nosepieces for bifocal eyeglasses which have resilient means for holding the nosepiece in place, thereby obviating the incenvenience of having the detachable nosepieces fall from the eyeglasses when the eyeglasses are removed.

More specifically, it is an object of this invention to provide novel detachable nosepieces having spring fingers for engaging edge portions of a pair of eyeglasses to hold the nosepiece in place thereon.

It is also an object of this invention to provide novel detachable nosepieces having lens receiving portions carried by resilient arms for engaging the edges of eyeglasses to hold said nosepieces in place thereon.

It is also an object of this inventiton to provide novel detachable nosepieces for bifocal eyeglasses having nosepiece elements which are readily and easily adjustable to vary the relative position of said nosepiece elements with respect to the eyeglasses on which they are used.

More particularly it is an object of this invention to provide novel detachable nosepieces in which the nosepiece elements are mounted on post-like members of material which may be bent to adjust the position of the nosepiece elements.

The foregoing and other ancillary objects of this invention will become more apparent from a reading of the following detailed description of several embodiments thereof when taken in connection with the appended claims and accompanying drawing, wherein:

Figure 1 is a front view of a pair of rimless bifocal eyeglasses of the so-called high-bridge type with a preferred form of my detachable nosepiece in position thereon;

Figure 2 is a plan view of the detachable nosepiece shown, in position, in Figure 1;

Figure 3 is a front view of the preferred form of my detachable nosepiece;

Figure 4 is a rear view of the detachable nosepiece;

Figure 5 is a partial sectional view of the nosepiece shown in Figures 1 to 4, inclusive, and illustrating the relative position of the nosepiece element with respect to the remainder of the device;

Figure 6 is a rear view of a pair of rimmed eyeglasses, of the so-called low bridge or saddle bridge type, with a detachable nosepiece in operative position thereon;

Figure 7 is a plan view of a modified form of detachable nosepiece, with portions of an eyeglass on which it is secured shown in dotted lines;

Figure 8 is a front view of a pair of spectacles with another modified form of detachable nosepiece assembled thereon; and Figure 9 is a plan view of still another modified form of detachable nosepiece constructed in accordance with my invention.

Referring now to Figure 1, the numeral 2 designates the lenses of a pair of bifocal eyeglasses having a high bridge element 4 secured thereto by bracket members 6 and screws 7. Nose pads 8 are carried by bracket members 6 on rearwardly extending arm portions 10 in the usual manner. Temple brackets 12 are likewise secured to the outer edges of lenses 2, which are provided, in their lower portions, with bifocal reading segments 14. The numeral 16 designates a preferred form of novel detachable nosepiece device in general, the details of this being shown more clearly, and on a larger scale, in Figures 2 to 5, to which reference is now especially made.

This detachable nosepiece comprises an arm member, or cross-bar, 18 preferably formed of material which may be bent. Secured to the outer end of arm 18, which is curved outwardly as shown, are substantially U-shaped spring elements or fingers 20. These spring fingers are secured to the end of arm 18 in any convenient manner, such as by welding, soldering or riveting, etc. Spring fingers 20 are bowed inwardly, as shown, to provide opposite points of contact 22.

Secured to the mid-point of arm 18 is a curved post member 24, formed of bendable material like arm 18, and carrying at its slower end a nosepiece element 26, formed of any suitable material and pivotally mounted thereon by a hinge joint 28. The hinge joint 28 is preferably somewhat loosely arranged so that nosepiece element 26 may have a substantially universal movement and thus can readily seat itself on the wearer's nose. The degree of pivotal movement is preferably limited so that by any type of suitable stops the nosepiece element cannot get too far out of position and come to rest with its edge on the wearer's nose. A ball and socket joint or other appropriate connection could be used to mount element 26 on post 24.

With the detachable nosepiece 16 removed, the glasses shown in Figure 1, will rest with nosepads 8 on the sides of the wearer's nose and with his normal line of vision passing through the approximate centers of the lenses 2 at points considerably above the upper part of reading segments 14. Now, if the wearer wishes to see through the lower, or bifocal reading section, he must either tip his head back, or arrange the reading matter, to bring his line of vision through the lower portions of the eyeglasses. With my novel detachable nosepiece in place, as shown in Figure 1, nosepiece element 26 will rest on the bridge of the wearer's nose and lenses 2 will be elevated sufficiently to bring the bifocal reading portions 14 within the normal line of vision of the wearer. The exact amount the lenses are raised can be readily varied by suitable bending of the post member 24 which, as has been previously mentioned, is made of bendable material for this particular reason.

Spring fingers 20 are made so as to snugly engage the edge of lenses 2 and the spacing of these U-shaped finger portions is such that they pass up over the lower inside part of the bracket 6, as can be seen from Figure 1. By making the arm portion 18 bendable, it is possible to adjust the width of the detachable nosepiece in order to accommodate it to different sizes of eyeglasses. Also, the detachable nosepieces 16 can be originally made in a wide range of sizes.

When in place, the upper edges of spring fingers 20 abut against the screw boss portions of brackets 6, as shown. The inwardly bowed portions 22 are preferably arranged to be substantially aligned with the screws 7, so that the nosepiece when being attached, cannot be accidently pushed up past the bridge brackets 6.

My novel detachable nosepiece can be very readily applied to, and removed from, eyeglasses as spring fingers 20 are of very light spring tension just sufficient to hold the detachable nosepiece in place when the eyeglasses are removed, either for detaching or putting on the detachable nosepiece. Also, if desired, the nosepiece can be applied to, or removed from, the eyeglasses without taking the glasses off, as it is a simple matter to slip the outer flaring ends of the spring fingers 20 over the inside edges of the lenses and then slide the nosepiece up into the position shown in Figure 1 without removing the eyeglasses.

In Figure 6, the nosepiece just described is shown applied to a pair of bifocal eyeglasses having lenses 32, with reading segments 40, provided with rims 36 having the so-called low bridge or saddle bridge type of nosepiece 34. In this application my improved detachable nosepiece functions the same as when used on the type of eyeglasses shown in Figure 1, except that spring fingers 20 now bear against nosepiece arms 38, instead of against screw bracket portions 6, as in the case of the eyeglass shown in Figure 1.

The detachable nosepiece device just described, as well as others to be described hereinafter, can be as readily applied to the rimmed type glasses of the high bridge type and also to rimless glasses of the low bridge type. Thus my novel attachment is universally adaptable for use on all types of eyeglasses.

Referring now to Figure 7, a modified form of detachable nosepiece is shown. In this form the arm 42 is made of resilient material, while the eyeglass engaging portions now consist of diverging finger elements 44 and 46 secured to opposite ends of arm 42 in any convenient manner, as by welding, soldering or riveting. These diverging fingers are made of substantially rigid material which, however, may be bent in order to adjust the diverging opening to eyeglass edge portions of different thicknesses. Fingers 44 and 46 are preferably of different lengths, as shown, to facilitate assembly, and spring fingers 20 may be similarly formed if desired. Secured to the mid-portion of arm 42 is a post member 48, which corresponds in structure and function to the arm 24 illustrated in Figures 1 to 5, and pivoted to the lower end of this post is a nosepiece element 50, corresponding to nosepiece element 26 in the first described embodiment.

This modification functions the same as that previously described, except that the resilient force for frictionally holding the attachment in place on the eyeglasses is provided by the resilient arm portion 42, arranged to be sprung together in fitting the attachment onto the eyeglass and when released to force fingers 46 and 44 outwardly so that they frictionally engage the edge of the eyeglass, as shown in Figure 7. To facilitate the handling of this type of detachable nosepiece the ends of arm 42 are extended and formed with relatively sharpened points 52 which may be readily gripped by the finger tips when attaching or detaching the nosepiece device. Similar gripping means may, of course, be provided on the detachable nosepiece shown in Figures 1-5, if desired.

It will be understood that this last described type of nosepiece, when mounted on eyeglasses of the type shown in Figure 1, or in Figure 6, will occupy the same relative position as the detachable nosepieces shown in these figures; the nosepiece element 50 resting on the wearer's nose in such a manner as to appropriately elevate the bifocal lenses. However, with this type of detachable nosepiece it is not necessary that finger elements 44—46 be brought to bear against brackets 6 or arms 38 as resilient arm 42 is sufficiently strong to hold the nosepiece in place.

Referring now to Figure 8, another modified form of detachable nosepiece is shown. In this form a bar or arm element 54 is provided having resilient end portions 56 joined thereto by welding or any other suitable means, at points 55. Bar 54 is preferably bowed outwardly slightly to clear the forehead of the wearer. Carried by end portions 56 are clip elements 58 adapted to clip over the outer sides of a pair of eyeglasses, as shown, and to be held in frictional engagement therewith by the resilient character of the end portions 56. Clip elements 58 are made of bendable material so that they can be shaped to nicely fit the edge of lenses 2—2 and hold end portions 56 snugly against the front of the lenses, just inside of their outer peripheral edges as shown. When so fitted bar or arm 54 is firmly mounted on the eyeglasses.

Arm portion 54 carries a post member 51, secured thereto by welding, soldering or riveting, or in any other convenient manner, and which, like post members 24 and 48 is made of bendable material.

Secured to the lower end of post member 51 is a nosepiece element 59, pivoted on hinge joint 60 for limited universal movement thereabout. Post 51 preferably extends downwardly in front of the bridge element 4 and is curved rearwardly to bring the nosepiece element 59 in proper position with respect to the lenses 2—2. Post member 51 is made of bendable material so that the exact position of nosepiece 59 can be readily adjusted to suit the requirements of the individual. This type of detachable nosepiece is especially easy and convenient to attach and is put in place in the same manner as a well known type of "antiglare" lenses widely used by automobile drivers.

The results accomplished by this form of detachable nosepiece are the same as those obtained by the previously described forms. With the position of the nosepiece element 59 appropriately adjusted, in the manner previously explained, and the attachment placed on the eyeglasses, the lenses will be raised just sufficiently to bring the lower bifocal reading segments substantially in the normal line of vision of the wearer.

Referring now to Figure 9, still another type of detachable nosepiece is shown. In this form the nosepiece element 61 is provided with forwardly extending arms 62 which carry on their outer ends resilient spring fingers 64, corresponding in structure and function to resilient fingers 20 of the detachable nosepiece illustrated in Figures 1 to 5. Arms 62 are made of bendable material in order that the position of nosepiece 61 may be adjusted and fingers 64 properly spaced. In order to facilitate the handling of this form of detachable nosepiece, finger-engaging projections 66 sharpened like the elements 52 of the modifications shown in Figure 7, are provided. The use of this modified form will, it is believed, be apparent from the previous description, and is exactly the same as that of the nosepiece shown in Figures 1 to 5, inclusive.

In all forms my novel detachable nosepiece is provided with resilient means for frictionally engaging portions of a pair of eyeglasses so that it is securely held in position, and yet, may be readily removed and put in place. Also, in all forms ready adjustment, both as to the position of the auxiliary nosepiece to regulate the amount of lens elevation effected as well as for size requirements, is provided; the first by bendable post members and the second by bendable cross-bar elements or bendable fingers. Thus my novel detachable nosepieces are all readily adaptable for use with all types of eyeglasses and afford complete flexibility of adjustment. All of my novel detachable nosepieces are of simple construction and inexpensive to make and moreover need be worn only when it is desired to raise the eyeglasses. Accordingly, the disadvantages of permanently attached auxiliary nosepieces are avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A removable attachment for multifocal eyeglasses of the type having a conventional bridge extending between a pair of lens units containing distance and reading lens portions, said attachment comprising a cross bar, clips on spaced portions of said bar adapted to frictionally engage said respective lens units and a nose engaging element depending from said cross bar, said attachment when clipped to said eyeglasses with its nose engaging element resting on the wearer's nose serving to support said eyeglasses in elevated position with the reading lens portions located directly in front of the wearer's eyes.

2. A removable attachment for multifocal eyeglasses of the type having a conventional bridge extending between a pair of lens units containing distance and reading lens portions, said attachment comprising a cross bar, spring clips at opposite ends of said bar adapted to interfit with edge portions of the respective lens units and a nose engaging element depending from said cross bar, said attachment when clipped to said eyeglasses with its nose engaging element resting on the wearer's nose serving to support said eyeglasses in elevated position with the reading lens portion located directly in front of the wearer's eyes.

3. A removable attachment for multifocal eyeglasses of the type having a conventional bridge extending between a pair of lens units containing distance and reading lens portions, said attachment comprising a cross bar, clips on opposite ends of said bar adapted to frictionally engage the respective lens units, a post depending from the medial portion of said bar and a rockable nose engaging element on the bottom of said post.

4. A removable attachment for multifocal eyeglasses of the type having a conventional bridge extending between a pair of lens units containing distance and reading lens portions, said attachment comprising a cross bar or arm of bendable material, a post secured at its upper end to an intermediate portion of said arm, a nose engaging element carried by the lower end of said post, and spring fingers carried by opposite ends of said arm for frictionally gripping adjacent edges of said lens units, said attachment when secured to said eyeglasses with its nose engaging element resting on the wearer's nose serving to support the eyeglasses in elevated position with the reading lens portion located directly in front of the wearer's eyes.

5. A detachable nosepiece for eyeglasses comprising an outwardly bowed arm, a curved post member carried by said arm at its mid-point, a nosepiece element secured to said post member for limited universal movement, and spring fingers associated with opposite ends of said arm for resiliently gripping portions of a pair of eyeglasses to removably hold said nosepiece thereon, said arm being formed of bendable material so that the spacing of its ends may be varied for different sized eyeglasses and said post being formed of bendable material so that the relative position of said nosepiece element with respect to said arm may be adjusted.

6. A removable attachment for multifocal eyeglasses of the type having a conventional bridge extending between a pair of lens units containing distance and reading lens portions, said attachment comprising an arcuate resilient arm, a post secured at one end to said arm and carrying a nose engaging element upon its other end, and clip means carried by opposite ends of said arm shaped to frictionally receive adjacent edge portions of said lens units and being urged toward said lens units by reason of the resiliency of said arm, said attachment when clipped to said eyeglasses with its nose engaging element resting on the wearer's nose serving to support the eyeglasses in elevated position with the reading lens portion located directly in front of the wearer's eyes.

7. A detachable nosepiece for eyeglasses comprising an arm having a substantially rigid mid-portion and resilient end portions, clip means carried by said end portions and adapted to frictionally engage opposite end edges of a pair of eyeglasses to hold said arm in position thereon, a post member secured to the mid-portion of said arm and extending downwardly therefrom, and a nosepiece element secured to the lower end of said post member.

8. A detachable nosepiece for eyeglasses comprising, an arm having resilient ends, clip means carried by the ends of said arm and adapted to be held in engagement with the outer edges of a pair of eyeglasses by said resilient ends for holding said arm on said eyeglasses, a post member of bendable material secured to said arm and extending downwardly therefrom, and a nosepiece mounted on the lower end of said post for limited universal movement thereon.

9. A detachable nosepiece for eyeglasses as set forth in claim 7, wherein said mid-portion is curved outwardly so as to clear a wearer's forehead.

10. A detachable nosepiece attachment for multifocal eyeglasses of the type having a conventional bridge extending between two lens units containing distance and reading lens portions, said attachment comprising a cross bar terminating at opposite ends in flexible end portions, clips on said flexible end portions fitting over adjacent edges of said lens units, a post depending from the mid-portion of said bar and a nose engaging element carried by said post, said attachment when clipped to said eyeglasses with its nose engaging element resting on the wearer's nose serving to support said eyeglasses in elevated position with the reading lens portion located directly in front of the wearer's eyes.

11. In the attachment recited in claim 10, said post being bendable for adjustment to suit the needs of an individual wearer and said nose engaging element being rockable on said post.

12. A detachable nosepiece attachment for multifocal eyeglasses comprising a cross bar adapted to extend generally transversely of the lens units of said eyeglasses, said bar being resilient at least at its end portions, clips secured upon said bar at said resilient end portions and interfitting with the edges of said lens units, finger grip projections outstanding from said resilient end portions, said projections being conveniently disposed to be gripped by the fingers of the wearer of said eyeglasses for flexing the resilient end portions of said bar while attaching and removing said attachment, a post substantially medially carried by said bar and a nose engaging element at the lower end of said post, said attachment when clipped to said eyeglasses with its nose engaging element resting on the wearer's nose serving to support said eyeglasses in elevated position with the reading lens portion located directly in front of the wearer's eyes.

13. An attachment for multifocal eyeglasses of the type having a conventional bridge extending between lens units containing reading and distance lens portions, said attachment comprising a rigid cross bar terminating at opposite ends in arcuate resilient end portions adapted to extend partly along the outer edges of said lens units, spaced clips on each of said resilient end portions interfitting with said lens unit edges and a nose engaging element carrying post depending from the medial portion of said cross bar.

CHARLES L. MOWRER.